US011032774B2

(12) United States Patent
Bonazzoli et al.

(10) Patent No.: US 11,032,774 B2
(45) Date of Patent: *Jun. 8, 2021

(54) MANAGEMENT OF MOBILE COMPUTING DEVICES IN EMERGENCY CONDITIONS

(71) Applicant: International Business Machines Corporation, Armonk, NY (US)

(72) Inventors: Simone Bonazzoli, Castel Gandolfo (IT); Marco Borgianni, Rome (IT); Claudio Falcone, Rome (IT); Alessio Fioravanti, Rome (IT); Ilaria Gorga, Rome (IT); Giuseppe Longobardi, Castellammare di Stabia (IT); Silvano Lutri, Rome (IT); Luigi Presti, Rovereto (IT); Paolo Salerno, Monterotondo (IT); Francesca Ziantoni, Vicovaro (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,702

(22) Filed: Jul. 25, 2019

(65) Prior Publication Data

US 2019/0364510 A1  Nov. 28, 2019

Related U.S. Application Data

(63) Continuation of application No. 15/985,909, filed on May 22, 2018, now Pat. No. 10,425,899.

(51) Int. Cl.
*H04W 76/12* (2018.01)
*H04W 52/02* (2009.01)
(Continued)

(52) U.S. Cl.
CPC ......... *H04W 52/0264* (2013.01); *H04W 4/90* (2018.02); *H04W 52/0277* (2013.01); *H04W 76/50* (2018.02)

(58) Field of Classification Search
CPC ....... G08B 25/016; H04W 4/22; H04H 20/16; H04H 20/59; G06Q 30/0269; G06Q 30/0267; A61B 15/02055; A05B 15/02; H04L 12/2803
USPC .............. 370/39; 455/404.1, 404.2; 340/546; 379/39
See application file for complete search history.

(56) References Cited

U.S. PATENT DOCUMENTS

| 9,014,656 B2 | 4/2015 | Courtney |
| 9,014,661 B2 | 4/2015 | deCharms |

(Continued)

FOREIGN PATENT DOCUMENTS

WO  2012024117 A2  2/2012

OTHER PUBLICATIONS

Bonazzoli et al., "Management of Mobile Computing Devices in Emergency Conditions", U.S. Appl. No. 15/985,909, filed May 22, 2018.

(Continued)

*Primary Examiner* — Phuoc H Doan
(74) *Attorney, Agent, or Firm* — Jamar K. Ray

(57) ABSTRACT

Provided is a method for managing a mobile computing device in an emergency condition that includes receiving an emergency message indicative of the emergency condition being distributed from a management computing system to any mobile computing devices in an emergency area corresponding to the emergency condition. The method includes collecting one or more involvement parameters depending on an involvement of a person associated with the mobile computing device in the emergency condition. The method includes determining an involvement indicator representative of the involvement of the person according to the involvement parameters. The method includes sending the (Continued)

involvement indicator to the management computing system. The method includes controlling one or more resources thereof according to the involvement indicator.

20 Claims, 8 Drawing Sheets

(51) Int. Cl.
*H04W 76/50* (2018.01)
*H04W 4/90* (2018.01)

(56) References Cited

U.S. PATENT DOCUMENTS

| | | |
|---|---|---|
| 9,247,408 B2 | 1/2016 | South |
| 9,497,585 B1 | 11/2016 | Cooley et al. |
| 2011/0130636 A1 | 6/2011 | Daniel et al. |
| 2011/0201300 A1 | 8/2011 | Ornstein |
| 2011/0212700 A1* | 9/2011 | Petite .................... G01S 19/17 455/404.1 |
| 2015/0147995 A1* | 5/2015 | Bontu .................. G08B 27/001 455/404.1 |
| 2015/0223705 A1* | 8/2015 | Sadhu ................ G08B 21/0446 600/301 |
| 2016/0005293 A1 | 1/2016 | Yoo et al. |

OTHER PUBLICATIONS

Bonazzoli et al., "Management of Mobile Computing Devices in Emergency Conditions", U.S. Appl. No. 16/521,690, filed Jul. 25, 2019.
IBM, List of IBM Patents or Patent Applications Treated as Related, Jul. 24, 2019, 2 pages.

* cited by examiner

MANAGEMENT OF MOBILE COMPUTING DEVICES IN EMERGENCY CONDITIONS

BACKGROUND

The present disclosure relates to the information technology field. More specifically, this disclosure relates to the management of mobile computing devices in emergency conditions.

A computer system can comprise of multiple computing systems—that include mobile devices—that are communicatively linked over a network. The mobile devices may include smart devices, such as tablets, laptops, cellular devices, and/or desktop computers. Digital information of each mobile device owner may be extracted from the mobile devices—with the owner's permission and over the network.

SUMMARY

Embodiments of the present invention disclose a method, computer program product, and system for managing a mobile computing device in an emergency condition. The method, computer program product, and system can receive an emergency message indicative of the emergency condition being distributed from a management computing system to any mobile computing devices in an emergency area corresponding to the emergency condition. The method, computer program product, and system can further collect one or more involvement parameters depending on an involvement of a person associated with the mobile computing device in the emergency condition. The method, computer program product, and system can further determine an involvement indicator representative of the involvement of the person according to the involvement parameters. The method, computer program product, and system can further send the involvement indicator to the management computing system. The method, computer program product, and system can further control one or more resources thereof according to the involvement indicator.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

DETAILED DESCRIPTION

Figure 1A:
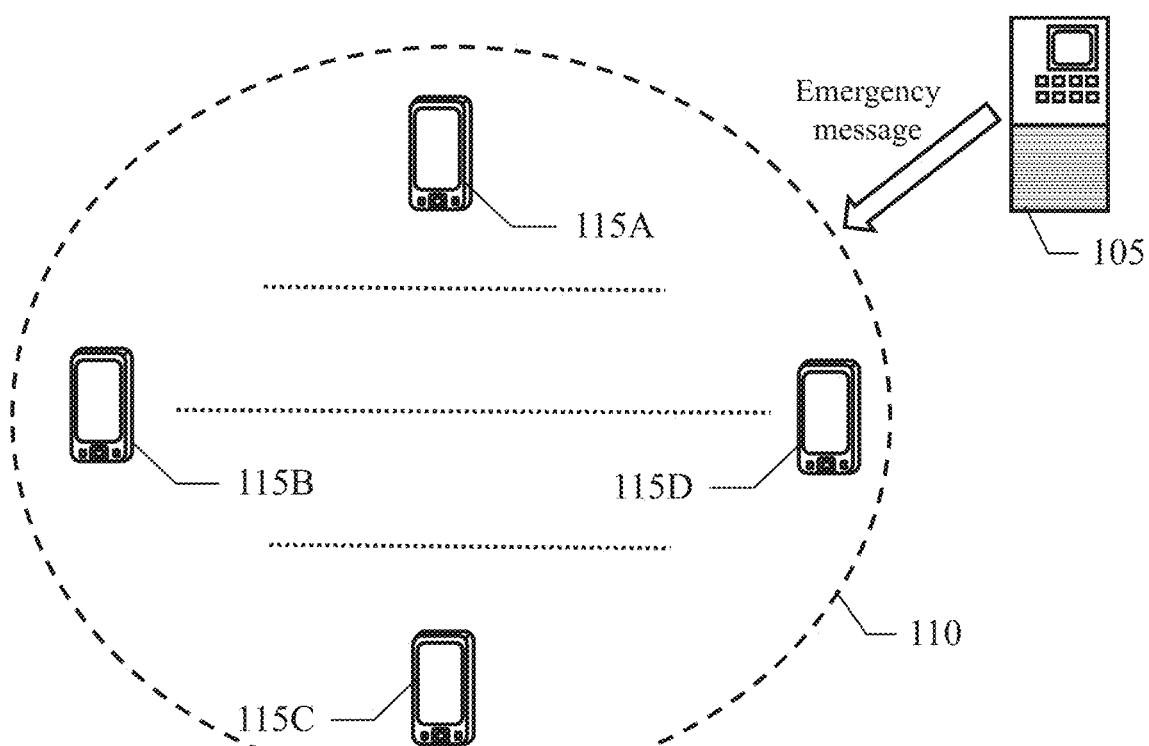
FIG. 1A illustrates a management computing system managing emergency conditions resulting from disasters, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In general, an emergency condition may be the result of a disaster involving serious impacts over a relatively short time; particularly, the disaster may have caused health detriments to people involved in the disaster. In addition, the disaster may pose an immediate threat to their health. Disasters—both man-made and natural—have escalated both in frequency and severity in the last several years. The management of most disaster emergency response logistics starts with a search and rescue of any involved persons. This may be to provide aid for alleviating or preventing the involved person's health detriments (such as by applying first medical treatments to the persons, removing the persons from dangerous positions, transporting the persons to hospitals). However, the search of the persons involved in several disasters, for example, when occurred in large and impervious regions, may be quite difficult, slow, and expensive.

Recently, the use of mobile computing devices has been proposed for facilitating the management of the disasters. For example, a warning alert may be broadcast to the mobile devices of the involved persons that are in a corresponding area. However, current techniques may be ineffective for persons that have suffered serious health detriments and are unable to provide any additional information about their state. Moreover, the collection of information from the mobile devices involves a relatively high traffic over a corresponding communication network, with the risk of its congestion. In any case, all the mobile devices are supplied by batteries that have a limited life. Therefore, the battery of any mobile device may discharge before the corresponding person has been rescued (for example, when the battery had a low charge level at the moment of the disaster and/or when the search and rescue operations are very long). When the battery is dead, the mobile device turns off so that no communication is possible with the person any longer.

Embodiments of the present disclosure can provide a technical solution to the problem of mobile device battery overconsumption, thereby allowing the mobile device to stay powered on and in communication with other devices. This may be particularly helpful in disaster situations, where rescuers can often take many hours or days to reach those in need, long after the mobile devices' battery power would normally be exhausted. It is to be understood that the aforementioned advantages are example advantages and should not be construed as limiting. Embodiments of the present disclosure can contain all, some, or none of the aforementioned advantages while remaining within the spirit and scope of the present disclosure.

Starting from FIG. 1A, a management computing system, such as a management server 105 is used to manage emergency conditions resulting from disasters, for example, natural disasters (like floods) or man-made disasters (like an oil spill or a fire). Whenever an emergency condition occurs in a corresponding emergency area 110, the management server 105 is notified accordingly, for example, by a monitoring organization (like civil protection, police, etc.). In response thereto, the management server 105 distributes an emergency message (indicative of the emergency condition) to any mobile computing devices, such as smartphones 115A-D that are present in the emergency area 110 (for example, via their mobile telephone operators). The smartphones 115A-D are generally held by corresponding persons (not shown in the figure) who are present in the emergency area 110 as well. Indeed, the smartphones 115A-D (like any other mobile computing devices) are adapted to be used while moving; for this purpose, the smartphones 115A-D are supplied by batteries, and they are quite small and light.

Figure 1B:
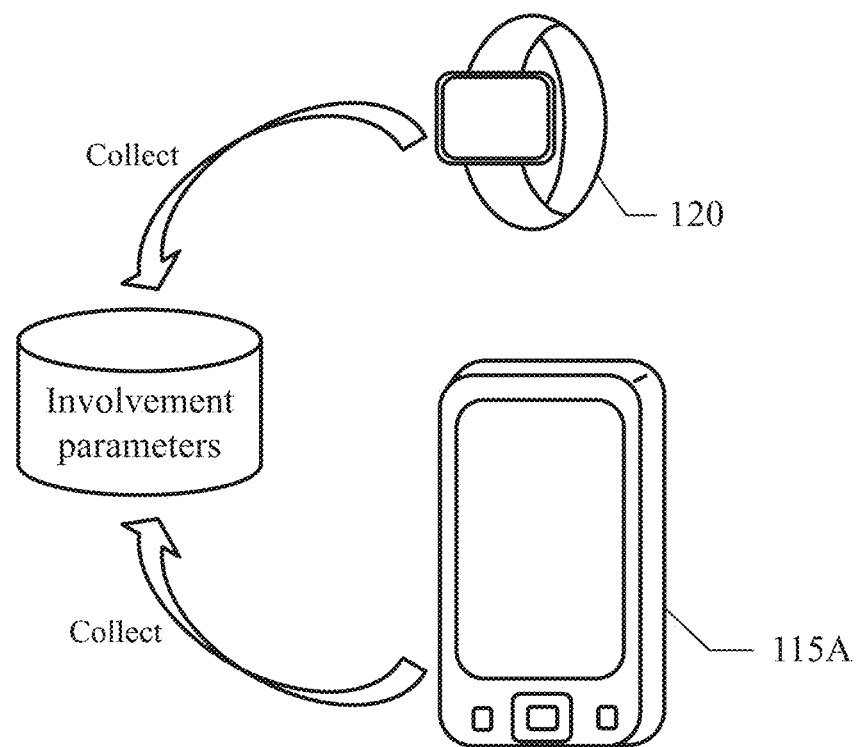
FIG. 1B illustrates electronic devices collecting one or more involvement parameters, according to an embodiment of the present disclosure.

Moving to FIG. 1B, in response to the emergency message, each smartphone 115 A-D (only 115A in the figure) collects one or more involvement parameters. The involvement parameters depend on an involvement of the person that holds the smartphone 115A in the emergency condition (such as his/her health condition). For example, the involvement parameters are determined from a sound that is recorded by a microphone of the smartphone 115A (such as recognizing a help request). In addition, the involvement parameters are defined by biometric (heartrate, perspiration, blood pressure, etc.) parameters of the person that are measured by a wearable unit, for example, a smart watch 120 that is associated with the smartphone 115A. In some embodiments, one or more of the involvement parameters may be pre-programmed based on a user's known health information (e.g., a known condition/ailment).

Figure 1C:
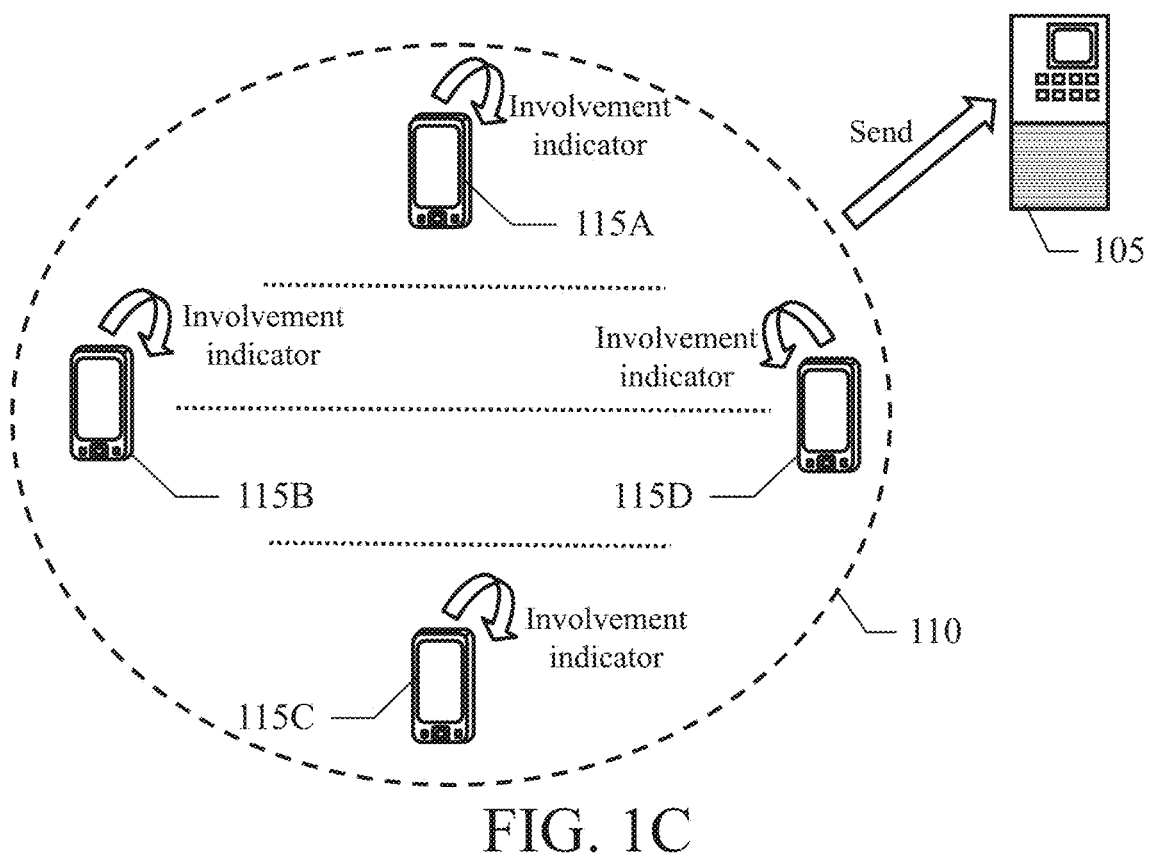
FIG. 1C illustrates the electronic devices determining involvement indicators according to involvement parameters, according to an embodiment of the present disclosure.

Moving to FIG. 1C, each smartphone 115A-D determines an involvement indicator according to the involvement parameters. The involvement indicator is representative of the involvement of the corresponding person in the emergency condition (for example, indicating a critical condition of the person when s/he is requesting help or has a very low blood pressure). The smartphones 115A-D send their involvement indicators to the management server 105 (for example, again via their mobile telephone operators).

Figure 1D:
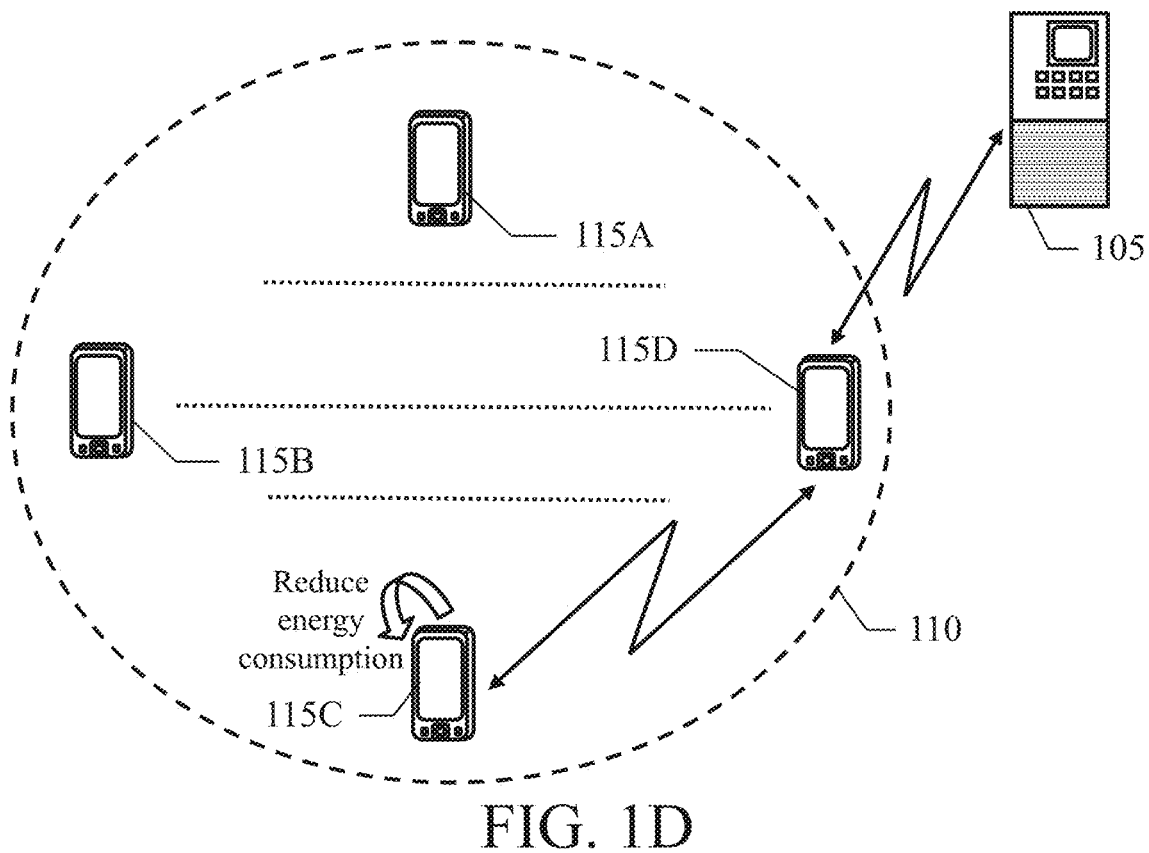
FIG. 1D illustrates the electronic devices controlling one or more resources thereof according to its involvement indicator, according to an embodiment of the present disclosure.

Moving to FIG. 1D, each smartphone 115A-D controls one or more resources thereof according to its involvement indicator. For example, the smartphone 115 of each person in the critical condition is assigned a critical role (referred to as critical smartphone). The critical smartphone 115C controls its resources to reduce an energy consumption thereof. Particularly, the critical smartphone 115C disables any remote communication functionalities (like 3G/4G and Wi-Fi). Additionally, one or more non-essential apps (e.g., an app that streams music, financial apps, etc.) may be deactivated. At the same time, the critical smartphone 115C enables a local communication functionality (like Bluetooth) for communicating with the management server 105 via one or more other smartphones having a relay role (referred to as relay smartphones and differentiated with the reference 115D).

The above-described solution allows determining the persons that are involved in the emergency condition (and particularly their health condition) with a reduced network traffic. Indeed, in embodiments, the determination of the involvement indicators is performed locally by the smartphones 115A-D; therefore, the amount of data that is sent to the management server 105 may be limited with a beneficial effect on the performance of a corresponding communication network.

Moreover, the usage of the resources of the smartphones 115A-D may be optimized for the management of the emergency condition. Particularly, by reducing the energy consumption of the critical smartphones 115C, it is possible to increase the life of their batteries. This significantly limits the risk that the batteries of the critical smartphones 115C discharge before the corresponding persons have been rescued (especially when the batteries had a low charge level at the moment of the disaster and/or when the search and rescue operations of the persons involved in the emergency condition are very long).

All of the above allows managing the emergency condition more efficiently, thereby reducing the harmful effects on the persons involved in it.

Figure 2:
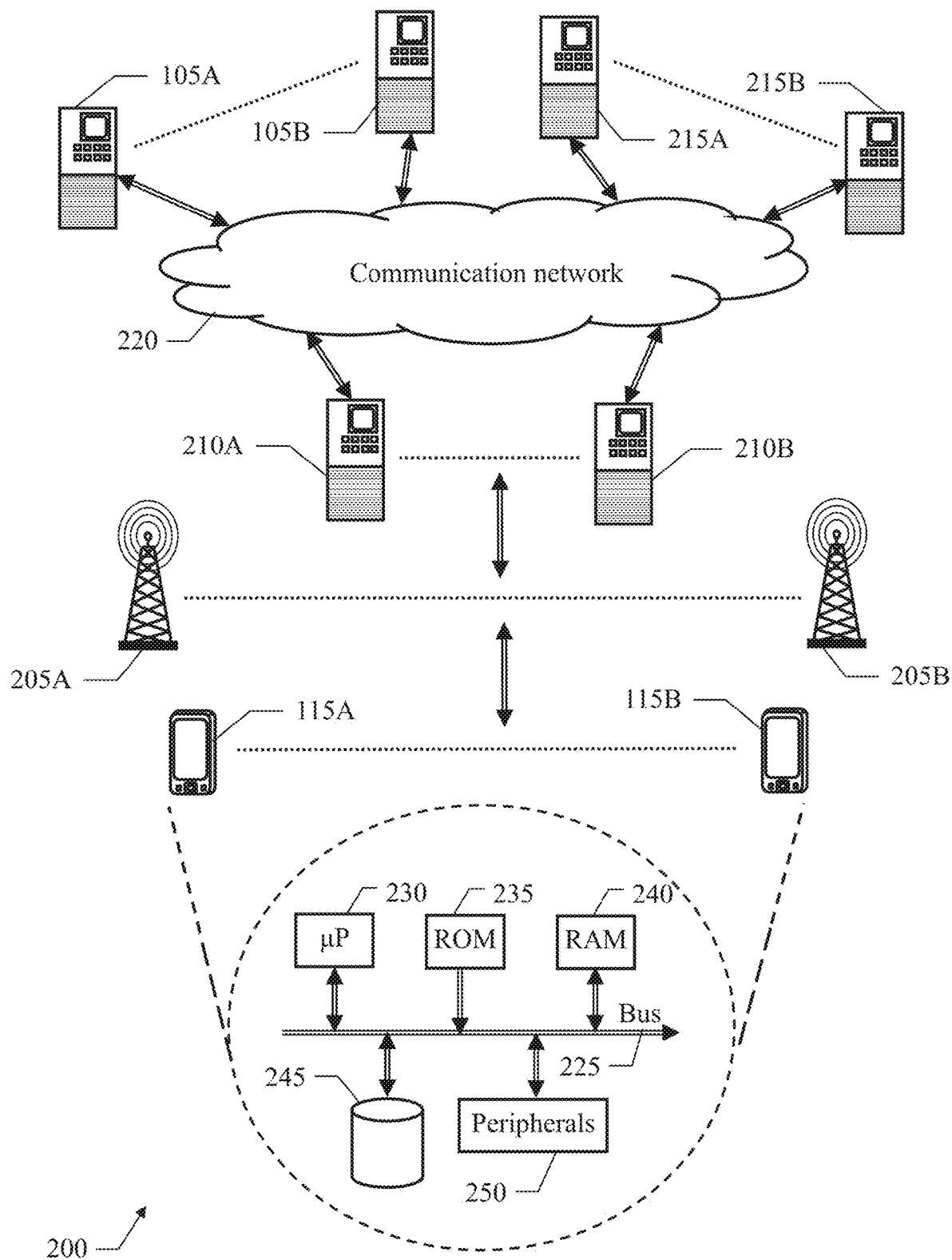
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced. The computing infrastructure 200 comprises the smartphones 115A-D (only 115A and 115B are shown), possibly with their smart-watches (not shown in the figure), of persons that might be involved in any emergency conditions to be managed by one or more instances of the management server 105, or management servers 105A, B. For example, the management servers 105A, B belong to management organizations in charge of managing the emergency conditions, and particularly their search and rescue operations, in corresponding territories (e.g., regions, states, etc.). The smartphones 115A-D may be connected to one or more mobile telephone networks 205A, B, which allow the smartphones 115A-D to exploit services offered by their mobile telephone operators, comprising 2G connections for performing telephone calls and exchanging SMSs and 3G/4G connections for exchanging data (such as in the Internet). One or more operator computing systems, for example, operator servers 210A, B of the mobile telephone operators control the corresponding mobile telephone networks 205A, B. One or more monitoring computing systems, for example, monitoring servers 215A, B of corresponding monitoring organizations (like seismographic centers, police, civil protection) monitor corresponding territories (like regions, states) for detecting emergency conditions that may occur therein. The management servers 105A, B, the operator servers 210A, B and the monitoring servers 215A, B communicate among them via a communication network 220 (for example, of global type like the Internet).

In some embodiments, the communication network 220 can be implemented using any number of any suitable communications media. For example, the communication network 220 may be a wide area network (WAN), a local area network (LAN), an internet, or an intranet. In certain embodiments, the management servers 105A, B, the operator servers 210A, B and the monitoring servers 215A may be local to each other, and communicate via any appropriate local communication medium. For example, management servers 105A, B, the operator servers 210A, B and the monitoring servers 215A may communicate using a local area network (LAN), one or more hardwire connections, a wireless link or router, or an intranet. In some embodiments, the management servers 105A, B, the operator servers 210A, B and the monitoring servers 215A may be communicatively coupled using a combination of one or more networks and/or one or more local connections. For example, the operator servers 210A, B may be hardwired to each other (e.g., connected with an Ethernet cable) while management servers 105A, B may communicate with the operator servers 210A, B using the communication network 220 (e.g., over the Internet).

Each of the above-mentioned computing machines (management servers 105A, B, smartphones 115A, B, operator servers 210A, B and monitoring servers 215A, B) comprises several units that are connected among them through a bus structure 225 with one or more levels (with an architecture that is suitably scaled according to the type of the computing machine 105, 115, 210, and/or 215). For example, one or more microprocessors (µP) 230 control operations of the computing machine 105, 115, 210, and/or 215. A non-volatile memory (ROM) 235 stores basic code for a boot-strap of any of the computing machines 105, 115, 210, and/or 215 and a volatile memory (RAM) 240 is used as a working memory by the microprocessor 230. The computing machines 105, 115, 210, and/or 215 is provided with a mass-memory 245 for storing programs and data, for example, storage devices of a data center wherein each (management, operator and monitoring) server 105, 210, and 215 is implemented and flash E²PROMs for the smartphones 115A-D. Moreover, the computing machines 105, 115, 210, and/or 215 comprise a number of controllers for peripherals, or Input/Output (I/O) units 250; for example, the peripherals 250 of each server 105, 210, and/or 215 comprise a network adapter for plugging the server 105, 210, and/or 215 into the data center and then connecting it to a console of the data center (for example, a personal computer, also provided with a drive for reading/writing removable storage units, such as optical disks like DVDs) and to a switch/router sub-system of the data center for its access to the (communication) network 220, whereas the peripherals 250 of each smartphone 115A-D comprise a mobile telephone transceiver (TX/RX) for communicating directly and a Wi-Fi network adapter (WNIC) for communicating via access points (not shown in the figure) with the corresponding mobile telephone network 205, a Bluetooth adapter for communicating locally with other smartphones 115, a touch-screen for displaying information and entering commands, a GPS receiver for detecting a position of one of the smartphones 115 and possibly the associated smart-watch.

Figure 3:
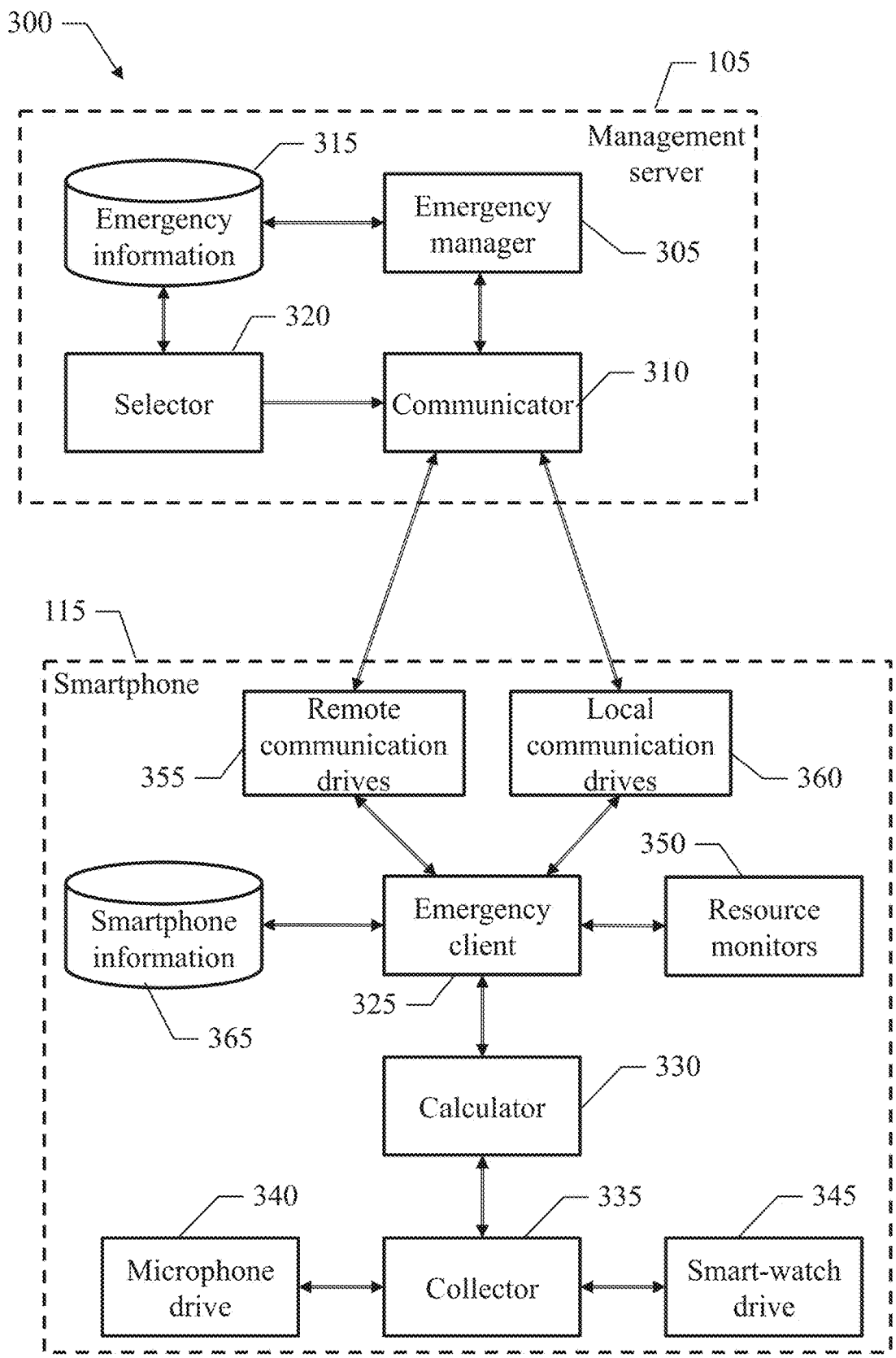
FIG. 3 shows the main software components that may be used to implement the solution, according to an embodiment of the present disclosure.

With reference now to FIG. 3, software components are shown that may be used to implement the solution according to an embodiment of the present disclosure.

Particularly, the software components (programs and data) are denoted with reference 300. The software components are typically stored in the mass memory and loaded (at least in part) into the working memory of the management servers 105 and of the smartphones 115A-D when the programs are running, together with corresponding operating systems and other application programs (not shown in the figure). The programs are initially installed into the mass memory, for example, from removable storage units or from a network. In this respect, each program may be a module, segment, or portion of code, which comprises one or more executable instructions for implementing the specified logical function.

Starting from each management server 105 (only one shown in the figure), it may comprise the following software components. An emergency manager 305 is used to manage the emergency conditions in charge of the corresponding management organization. The emergency manager 305 communicates (for example, over the Internet) with the monitoring servers (not shown in the figure) of the corresponding territory for being notified of any emergency condition occurred therein. The emergency manager 305 interacts with a communicator 310, which communicates (for example, over the Internet) with the operator servers (not shown in the figure) for communicating with the corresponding smartphones 115A-D. The emergency manager 305 accesses (in read/write mode) an emergency information repository 315, which comprises an entry for each emergency condition that is in progress. The entry stores (central) emergency information of the emergency condition and a list of records for the smartphones that are present in the corresponding emergency area. The central emergency information indicates an emergency type (for example, a textual description) and the emergency area (for example, defined by GPS coordinates of vertexes of a polygon enclosing it) of the emergency condition. The record of each smartphone stores identification information and (central) smartphone information of the smartphone. The identification information indicates the smartphone (for example, its telephone number), the corresponding mobile telephone operator (for example, its identifier) and possibly the person holding the smartphone (for example, his/her name). The central smartphone information indicates the position (for example, defined by GPS coordinates), the role, one or more resource metrics and a communication mode of the smartphone, it indicates the involvement indicator of the person holding the smartphone and it indicates a last update of the central smartphone information. The role may have the value "critical" when the person holding the (critical) smartphone is in the critical condition, "relay" when the (relay) smartphone shares a communication functionality thereof with the critical smartphones for communicating with the management server 105, or "none" otherwise. Each resource metric indicates a state of a corresponding (hardware/software) resource of the smartphone (such as a charge level of its battery, a quality of its 3G/4G connection, a quality of its Wi-Fi connection, a Bluetooth type, etc.). The communication mode of the smartphone (when it has the critical role) may have the value "remote" when the critical smartphone communicates with the management server 105 directly with its (remote) communication functionalities or the value "local" when the critical smartphone communicates with the management server 105 via the relay smartphones with its (local) communication functionalities. A selector 320 selects the relay smartphones (among the smartphones in the emergency area). The selector 320 accesses (in read/write mode) the emergency information (state information repository) 315 and it interacts with the communicator 310.

Moving to each smartphone 115 (only one shown in the figure), the following may be included in each individual smartphone 115. An emergency client 325 manages the smartphone 115 when it is present in any emergency area. The emergency client 325 exploits a calculator 330, which calculates the involvement indicator of the person holding the smartphone 115. In turn, the calculator 330 exploits a collector 335, which collects the involvement parameters of the person. For this purpose, the collector 335 exploits a microphone drive 340 driving the microphone of the smartphone 115 and a smart-watch drive 345 driving the possible smart-watch associated with the smartphone 115 (not shown in the figure). The emergency client 325 exploits one or more resource monitors 350, each one monitoring a corresponding resource of the smartphone (for example, its battery, 3G/4G connection, Wi-Fi connection), comprising a GPS drive that drives the GPS receiver. Moreover, the emergency client 325 exploits one or more remote communication drives 355 driving corresponding (remote communication) peripherals of the smartphone 115, which are used to communicate with the management server 105 via the corresponding mobile telephone network (such as the mobile telephone transceiver and the Wi-Fi network adapter). Likewise, the emergency client 325 exploits one or more local communication drives 360 driving corresponding (local communication) peripherals of the smartphone 115, which are used to communicate with the relay smartphones (such as the Bluetooth adapter). The emergency client 325 accesses (in read/write mode) a smartphone information repository 365, which stores (local) smartphone information of the smartphone 115 (when it is present in any emergency area). For example, the local smartphone information indicates the emergency type of the emergency condition, it indicates the position, the role (e.g., "critical," "relay," or "none"), the resource metrics and the communication mode (e.g., "remote" or "local" when the role is "critical") of the smartphone 115, and it indicates the involvement parameters and the involvement indicator of the person.

Figure 4A:
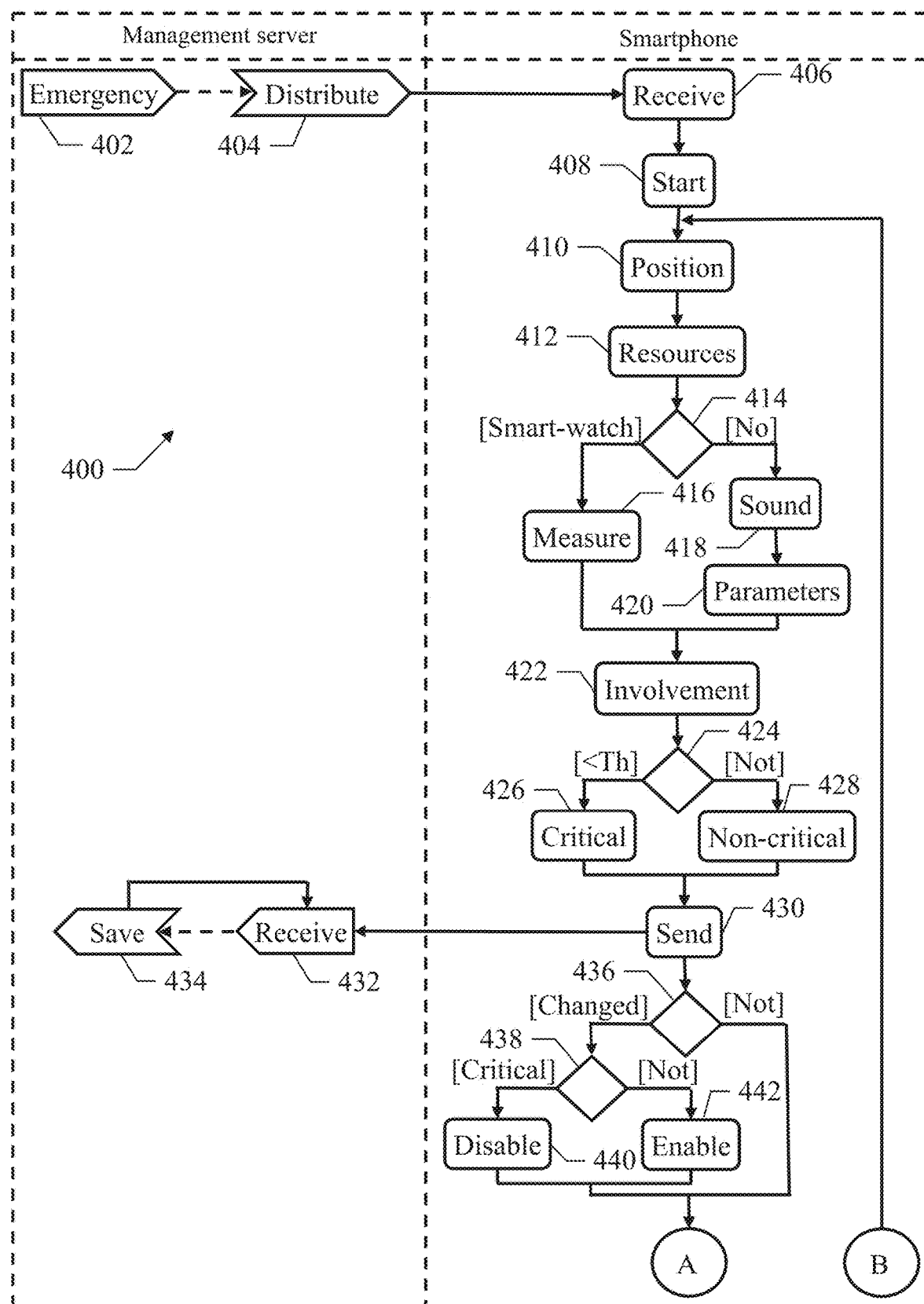
FIG. 4A illustrates a first activity diagram describing the flow of activities, according to an embodiment of the present disclosure.
Figure 4B:
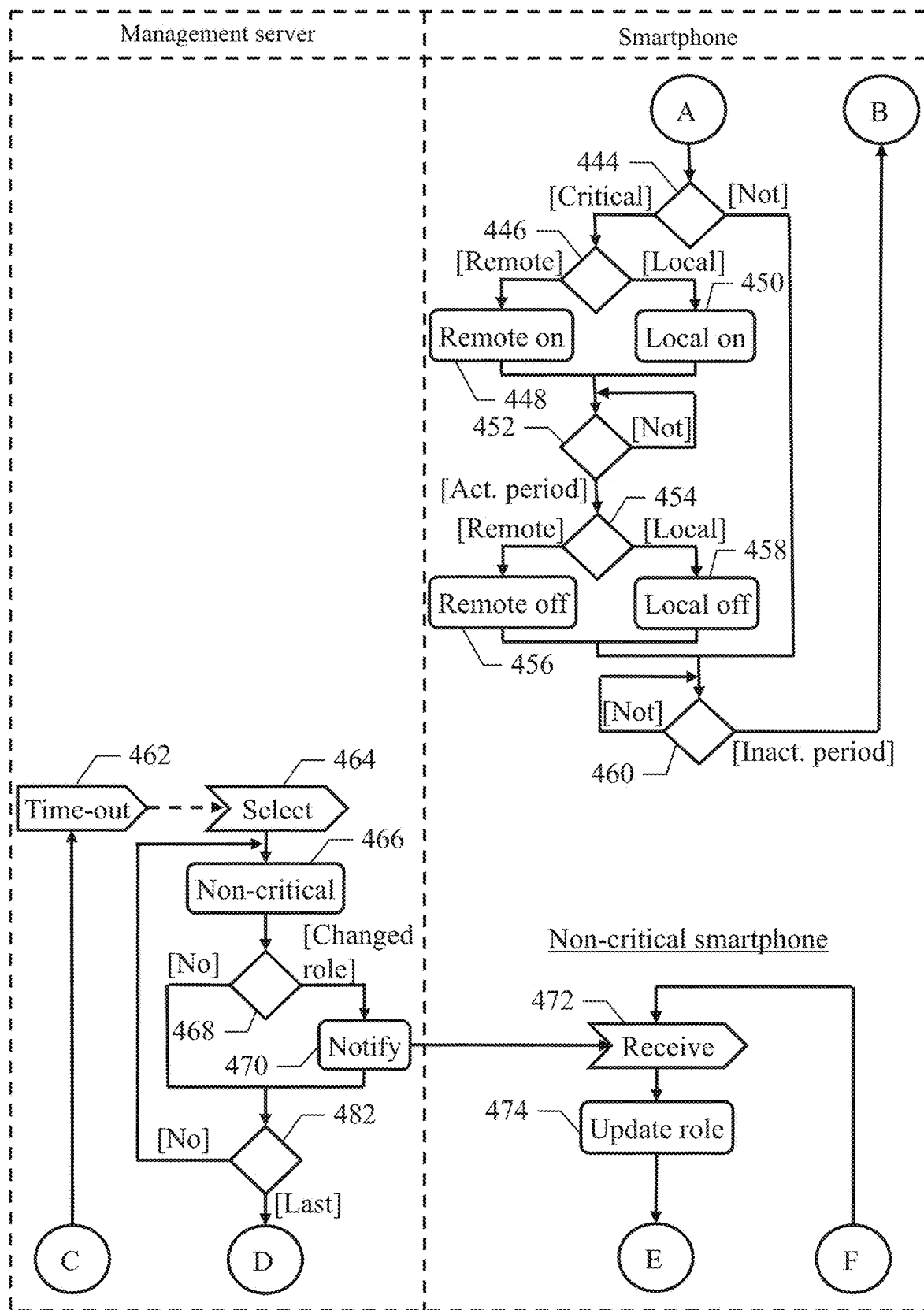
FIG. 4B illustrates a second activity diagram describing the flow of activities, according to an embodiment of the present disclosure.
Figure 4C:
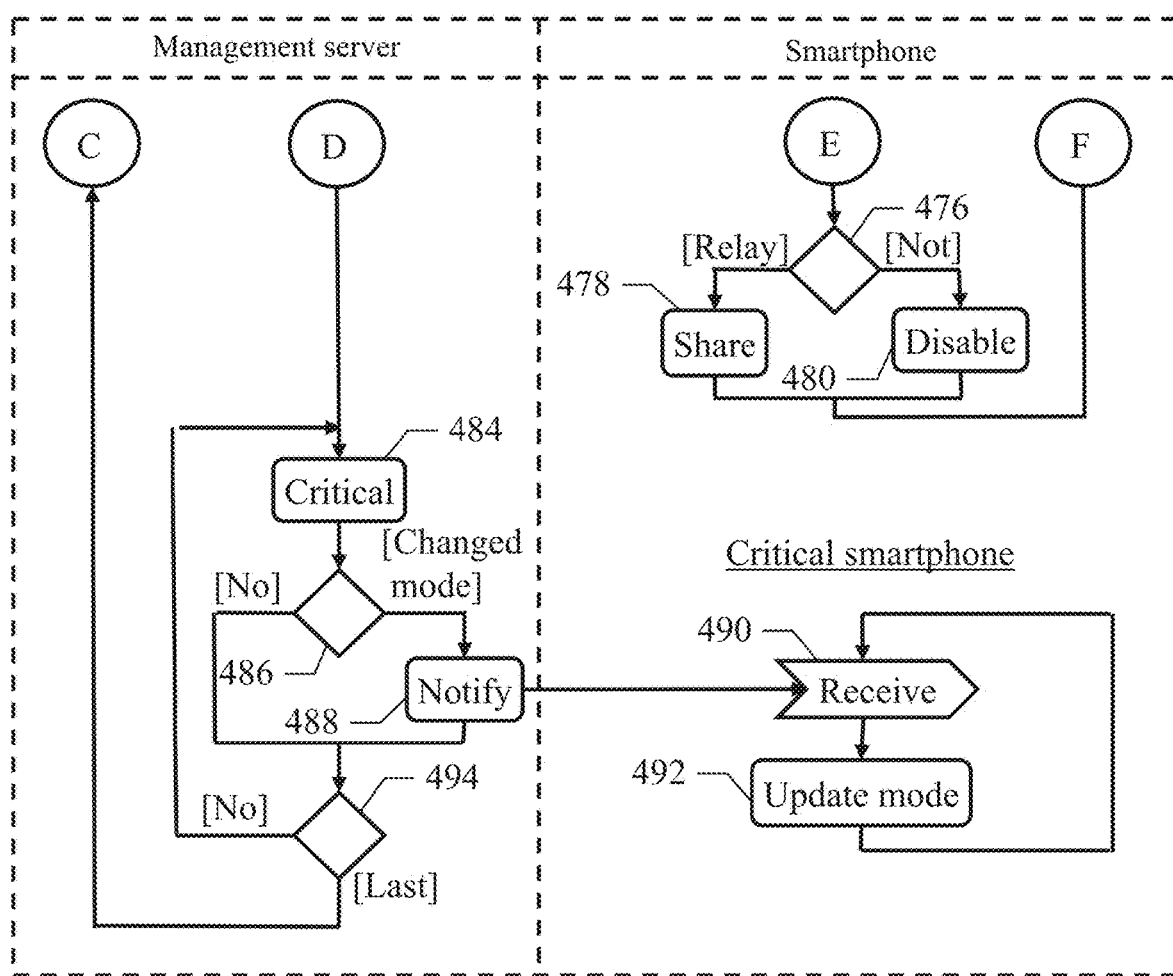
FIG. 4C illustrates a third activity diagram describing the flow of activities, according to an embodiment of the present disclosure.

With reference now to FIG. 4A-FIG. 4C, an activity diagram is shown describing the flow of activities relating to an implementation of the solution according to an embodiment of the present disclosure. Particularly, the diagram represents an exemplary process that may be used to manage an emergency condition with a method 400. In this respect, each block may correspond to one or more executable instructions for implementing the specified logical function on the corresponding computing machines (management server and smartphone).

The process can start at block 402 in the swim-lane of a generic management server as soon as the management server is notified of any emergency condition (to be managed by its management organization). For example, when the emergency condition is detected by any monitoring organization (like an earthquake by the seismographic centers, a flood by the civil protection), its monitoring server sends a corresponding emergency notification to the management server; the emergency notification indicates the emergency type and the emergency area of the emergency condition. In response thereto, the emergency manager updates the emergency information repository accordingly. Particularly, the emergency manager adds a (new) entry for the emergency condition. The emergency manager initializes the central emergency information of this entry by saving the emergency type and the emergency area.

Continuing to block 404, the emergency manager distributes (via the communicator) a corresponding emergency message to all the smartphones that are present in the emergency area. For example, the emergency manager forwards the emergency notification to all the operator servers. In turn, each operator server sends the emergency message (such as in the form of a notification comprising the emergency type) to its smartphones associated with the emergency area (such as connected to base stations of the mobile telephone network covering at least part of the emergency area).

Moving to the swim-lane of a generic smartphone in the emergency area, the emergency message is received at block 406. In response thereto, the smartphone at block 408 starts the management client (for example, by launching a corresponding application that is given a highest priority). This way, there is no interference with the normal operation of the smartphone (since the management client is activated only when it is necessary). In some embodiments, the management client may initialize the smartphone information repository by saving the emergency type and by setting the role to "none" and the communication mode to "remote." At a substantially similar time, the management client may display corresponding information to the person using a GUI (e.g., the emergency type). Continuing to block 410, the emergency client commands the GPS drive to cause the GPS receiver to measure the position of the smartphone (defined by its GPS coordinates) and saves it into the smartphone information repository (by replacing its possible previous value). The emergency client at block 412 commands the resource monitors to measure the resource metrics of the corresponding resources (such as the charge level of the battery, the quality of the 3G/4G connection, the quality of the Wi-Fi connection, the type and quality of the Bluetooth connection) and saves them into the smartphone information repository (by replacing their possible previous values). In some embodiments, the previous values are saved to a historical database and statistical analysis is performed on the previous values. This may be useful for predicting effective rescue measures for a future disaster. The flow of activity then branches at block 414 according to a configuration of the smartphone. If the smartphone is associated with the smart-watch (or any other any wearable unit), the management client at block 416 commands the smart-watch drive to cause the smart-watch to measure one or more biometric parameters of the person wearing it (for example, blood pressure, heart pulses, breath frequency). These biometric parameters define corresponding involvement parameters (of the person holding the smartphone), which are saved into the smartphone information repository (by replacing their possible previous values). In some embodiments, the previous values are saved to a historical database and statistical analysis is performed on the previous values.

Conversely, if the smartphone is not associated with any wearable unit, the management client at block 418 commands the microphone drive to cause the microphone to record a sound for a pre-defined time interval (for example, 10-20 seconds). The management client at block 420 determines one or more involvement parameters (of the person holding the smartphone) according to the recorded sound and saves them into the smartphone information repository (by replacing their possible previous values). For example, the management client exploits cognitive techniques to determine corresponding behavior parameters that indicate how the person is behaving (for example, asserted when the person is requesting help, is moaning, is shouting, has a shallow breath). In this way, the involvement parameters may be collected automatically; this applies even when the person has suffered serious health detriments and then is unable to provide information about his/her condition. In some embodiments, the sound data is recorded even if there is a connected smart-watch or other wearable. In these embodiments, the sound data and the measurements from the wearable devices may both be used to determine the involvement parameter.

In both cases, the flow of activity merges again at block 422 from either the block 416 or the block 420. At this point, assuming that at least one involvement parameter has changed, the management client determines the involvement indicator (of the person holding the smartphone) and saves it into the smartphone information repository (by replacing its possible previous value). The involvement indicator is determined according to the involvement parameters. For example, the involvement indicator ranges from 0 to 1, with the lower the involvement indicator the more critical a condition of the person (for example, his/her health is worse, or there is more risk for it). At the beginning, the involvement indicator is set to 1. When any behavior parameter is asserted (such as the person is requesting help, is moaning, is shouting or has a shallow breath), the involvement indicator is reduced by a corresponding percentage (such as from 20% to 60% according to a confidence of the determination of the behavior parameter). Moreover, when any biometric parameter has been measured and its measured value is lower than a standard value thereof, the involvement indicator is reduced by the difference between the standard value and the measured value divided by the standard value and multiplied by a scaling factor (such as 0.5-1).

Accordingly, the flow of activity branches at block 424 based on the involvement indicator. If the involvement indicator is (possibly strictly) lower than an involvement threshold (for example, 0.3-0.5), the person is in a critical condition (for example, because his/her health is deteriorating, like when the person is severely injured and/or unconscious). In this case, if the status of the smartphone in the smartphone information repository is "none" or "relay," the emergency client at block 426 changes it to "critical." Conversely, if the involvement indicator is (possibly strictly) higher than the same involvement threshold, the person is not in the critical condition (for example, because his/her health is relatively good). In this case, if the role of the smartphone in the smartphone information repository is "critical," the emergency client at block 428 changes it to "none."

In both cases, the flow of activity descends into block 430 from either the block 426 or the block 428. At this point, the management client sends an updating message to the corresponding operator server. The updating message comprises the position, the role, and the resource metrics of the smartphone and the involvement indicator of the person (retrieved from the smartphone information repository). In turn, the operator server adds an identifier of the corresponding mobile telephone operator, the telephone number of the smartphone and, provided that a corresponding authorization has been given, the name of the person registered in association with the telephone number and then likely to hold the smartphone (retrieved from a customer database of the mobile telephone operator) to the updating message and forwards it to the management server.

Returning to the swim-lane of the management server, the emergency manager at block 432 receives (via the communicator) the updating message from any smartphone. In response thereto, the emergency manager at block 434 updates the entry of the emergency condition in the emergency information repository accordingly. Particularly, if no record exists for the smartphone (as indicated by its telephone number), the emergency manager adds a (new) record for it. The emergency manager initializes the record of the smartphone by saving the telephone number of the smartphone, the identifier of the mobile telephone operator and the possible name of the person into the identification information of the smartphone, and/or by setting the communication mode of the smartphone to "remote" into the central smartphone information. In any case, the emergency manager saves the position, the role and the resource metrics of the smartphone and the involvement indicator of the person into the central smartphone information of the record of the smartphone, and it sets its last update to the current time (by replacing their possible previous values). In some embodiments, the previous values are saved to a historical database and statistical analysis is performed on the previous values. The process then returns to the block 432 waiting for a next updating message.

At the same time, in the swim-lane of the smartphone, the process descends from the block 430 into block 436. If the role (status) of the smartphone has changed (at blocks 426 or 428), the flow of activity branches at block 438 according to its value. If the smartphone has changed to the critical role, the emergency client at block 440 disables one or more functionalities (e.g., disables an application, lowers the GUI's screen intensity, switches the smartphone into a power-saving mode, etc.) of the smartphone to reduce its energy consumption. As an additional example, the emergency client turns off all the apps (different from it) that are running on the smartphone, the 3G/4G connection, the Wi-Fi connection, the display, etc. In some embodiments, the 3G/4G connection may be turned off, but reactivated if the user attempts to call a whitelisted emergency number, such as a close relative or emergency services. Conversely, if the smartphone has left the critical role (that is changed from a critical status to a non-critical status), the emergency client—in some embodiments and depending on the quantity of battery life—at block 442 enables at least part of the functionalities of the smartphone that have been disabled previously (when the smartphone had the critical role). For example, the emergency client turns on the 3G/4G connection and the Wi-Fi connection.

Moving to FIG. 4B, in both cases, the flow of activity descends into block 444 from either block 440 or block 442. The same point is also reached directly from the block 436 if the role of the smartphone has not changed. At this point, the flow of activity branches again according to the role of the smartphone (as indicated in the smartphone information repository). If the smartphone has the critical role, the flow of activity further branches at block 446 according to the communication mode of the smartphone (as indicated in the smartphone information repository). If the smartphone has the remote communication mode, the emergency client at block 448 activates (e.g., turns on) a remote communication channel of the smartphone. The remote communication channel is implemented by a remote communication functionality of the smartphone, which may be used to communicate with the management server via the mobile telephone network (for example, a Wi-Fi connection if available or a 3G/4G connection otherwise).

Conversely, if the smartphone has the local communication mode, the emergency client at block 450 activates (e.g., turns on) a local communication channel of the smartphone; the local communication channel is implemented by a local communication functionality of the smartphone, which may be used to communicate with one or more relay smartphones (for example, a Bluetooth connection), which in turn share a (remote) communication functionality thereof for communicating with the management server (via the mobile telephone network). This creates a local (peer-to-peer) network among the critical smartphones (with the local communication mode) and the relay smartphones, to increase the saving of energy of the critical smartphones.

In both cases, the emergency client enters an idle loop at block 452 from either the block 448 or the block 450, waiting for an activity period (for example, 1-5 minutes). During the activity period, the smartphone and the management server may communicate (over the remote/local communication channel), for example, to send instructions from the emergency organization to the person, to send information/feedback from the person to the emergency organization (possibly involving a manual change of the role of the smartphone by the person).

As soon as the activity period expires, the process descends into block 454. At this point, the flow of activity further branches according to the communication mode of the smartphone. If the smartphone has the remote communication mode, the emergency client at block 456 deactivates (e.g., turns off) the remote communication channel of the smartphone. Conversely, if the smartphone has the local communication mode, the emergency client at block 458 deactivates (e.g., turns off) the local communication channel of the smartphone.

In both cases, the emergency client enters a further idle loop at block 460 from either the block 456 or the block 458; the same point is also reached directly from the block 444 when the smartphone's role is not set as critical. In this phase, the emergency client remains in a waiting condition for an inactivity period. The inactivity period depends on the involvement indicator and on the charge level of the battery (as indicated in the smartphone information repository), with the lower the involvement indicator/charge level the longer the inactivity period; for example, the inactivity period (Ti) may be set to:

$$Ti = Tmax * Fi * (1-Ii) * Fb * (1-Pb),$$

wherein Tmax is a maximum value of the inactivity period (such as 30-60 minutes), wherein Ii is the involvement indicator and Pb indicates the charge level of the battery (from 0 to 1), and wherein Fi and Fb are corresponding scaling factors (such as 0.5-1). Therefore, the critical smartphone remains inactive during the inactivity period (communicating with the management server only periodically during the activity period), to increase the saving of energy.

As soon as the inactivity period expires, the process returns to the block 410 to repeat the above-described operations continuously (until the emergency condition is resolved). As a result, the involvement parameters of the person are collected, the involvement indicator of the person is determined and the role of the smartphone is assigned continually. In this way, the role of the smartphone self-adapts to the current health/risk condition of the person (for example, passing to the critical role or leaving the critical role when the health condition of the person worsens or improves, respectively). Moreover, the emergency manager receives the position, the role, and the resource metrics of the smartphones and the involvement indicator of their persons continuously. Accordingly, the emergency manager has an up-to-date overview (substantially in real-time) of the persons in the emergency area and of their smartphones, which may be used to manage the emergency condition very efficiently. For example, the involvement indicators of the persons allow optimizing of the rescues by giving priority to the persons with the lowest involvement indicators (for example, in the worst health conditions or with the highest risk for it).

Referring now to the swim-lane of the management server, the process passes from block 462 to block 464 as soon as an updating period expires (for example, every 20-40 minutes). In response thereto, the emergency manager selects one or more of the smartphones to be assigned the relay role. The relay smartphones are selected according to one or more communication parameters of each (non-critical) smartphone that does not have the critical role (e.g., "relay" or "none"). The communication parameters (defined by corresponding resource metrics retrieved from the emergency information repository) are indicative of a (communication) capability of the non-critical smartphone to share a (remote) communication functionality thereof (for communicating with the management server) with the critical smartphones (for example, defined by a charge level of its battery, a quality of its 3G/4G connection, a quality of its Wi-Fi connection, its position). For example, the emergency manager at first determines (candidate) non-critical smartphones that may communicate with (candidate) critical smartphones via their local communication functionalities according to their positions (for example, at a distance of 10-100 meters according to the type of their Bluetooth adapters) and that are active (for example, when the last update of their records is not older than a threshold, e.g., 20-30 minutes). The emergency manager calculates a communication capability index for each candidate non-critical smartphone according to its communication parameters different from the position. For example, the communication capability index (CCI) may be set to:

$$CCI = Fb * Pb * (Fg * Pg + Fw * Pw),$$

wherein Pb indicates the charge level of the battery, Pg indicates the quality of the 3G/4G connection and Pw indicates the quality of the Wi-Fi connection (from 0 to 1), and wherein Fb, Fg and Fw are corresponding scaling factors (such as 0.5-1). The communication capability index has a value higher than 0 (corresponding to the battery completely discharged and/or no 3G/4G connection nor Wi-Fi connection), increasing with the charge level of the battery and the quality of the 3G/4G connection and Wi-Fi connection. The emergency manager selects the candidate non-critical smartphones in decreasing order of their communication capability indexes until they allow communicating with all the candidate critical smartphones (via their local communication functionalities) or all of them have been selected; the selected candidate non-critical smartphones are assigned the relay role (whereas the other non-critical smartphones are assigned the none role), and the selected candidate critical smartphones are assigned the local communication mode (whereas the other critical smartphones are assigned the remote communication mode). In this way, the relay smartphones change dynamically according to their current communication capabilities, to optimize the exploitation of the non-critical smartphones to support the critical smartphones.

A loop is then entered for processing the non-critical smartphones. The loop begins at block 466, wherein a (current) non-critical smartphone is considered (starting from a first smartphone in any arbitrary order). The flow of activity branches at block 468 according to the role of the non-critical smartphone. If the role of the non-critical smartphone has changed (at the block 464 between "relay" and "none"), the management server at block 470 sends a corresponding switching message (via the communicator) to the non-critical smartphone. The switching message comprises the (new) role of the non-critical smartphone. For example, the switching message is sent to the operator server of the non-critical smartphone (as indicated in the emergency information repository), which in turn forwards it to the non-critical smartphone.

Moving to the swim-lane of the non-critical smartphone, the emergency client at block 472 receives the switching message from the management server. In response thereto, the emergency client at block 474 updates the role of the smartphone in the smartphone information repository accordingly. The flow of activity then branches at block 476 according to the role of the non-critical smartphone. If the non-critical smartphone has the relay role (e.g., it has become a relay smartphone), the emergency client at block 478 enables the sharing of a (remote) communication functionality thereof (for example, 2G/3G connection or Wi-Fi connection) with the critical smartphones (for example, via Bluetooth connection) for communicating with the management server 105. Conversely, if the non-critical smartphone has the "none" role (e.g., it is not a relay smartphone any longer), the emergency client at block 480 disables the sharing of its communication functionality. In both cases, the process then returns from either the block 478 or the block 480 to the block 472 waiting for a next switching message.

Referring back to the swim-lane of the management server, the process descends from the block 470 into block 482; the same point is also reached directly from the block 468 if the role of the non-critical smartphone has not changed. At this point, the emergency manager verifies whether a last non-critical smartphone has been processed. If not, the flow of activity returns to the block 466 to repeat the same operations on a next non-critical smartphone. Conversely (once all the non-critical smartphones have been processed), the loop is exited, descending into block 484.

Another loop is then entered for processing the critical smartphones. The loop begins by taking a (current) critical smartphone into account (starting from a first one in any arbitrary order), as shown in FIG. 4C. The flow of activity branches at block 486 according to the communication mode of the critical smartphone. If the communication mode of the critical smartphone has changed (at the block 464 between "remote" and "local"), the management server at block 488 sends a corresponding (further) switching message (via the communicator) to the critical smartphone; the switching message comprises the (new) communication mode of the critical smartphone. For example, the switching message is sent to the operator server of the critical smartphone (as indicated in the emergency information repository), which in turn forwards it to the critical smartphone.

Moving to the swim-lane of the critical smartphone, the emergency client at block 490 receives the switching message from the management server. In response thereto, the emergency client at block 492 updates the communication mode of the smartphone in the smartphone information repository accordingly. The process then returns to the block 490 waiting for a next switching message.

Referring to the swim-lane of the management server, the process descends from the block 488 into block 494; the same point is also reached directly from the block 486 if the communication mode of the critical smartphone has not changed. At this point, the emergency manager verifies whether a last critical smartphone has been processed. If not, the flow of activity returns to the block 484 to repeat the same operations on a next critical smartphone. Conversely (once all the critical smartphones have been processed), the loop is exited, returning to the block 462 to repeat the same operations periodically at a next expiration of the updating time-out.

Figure 5:
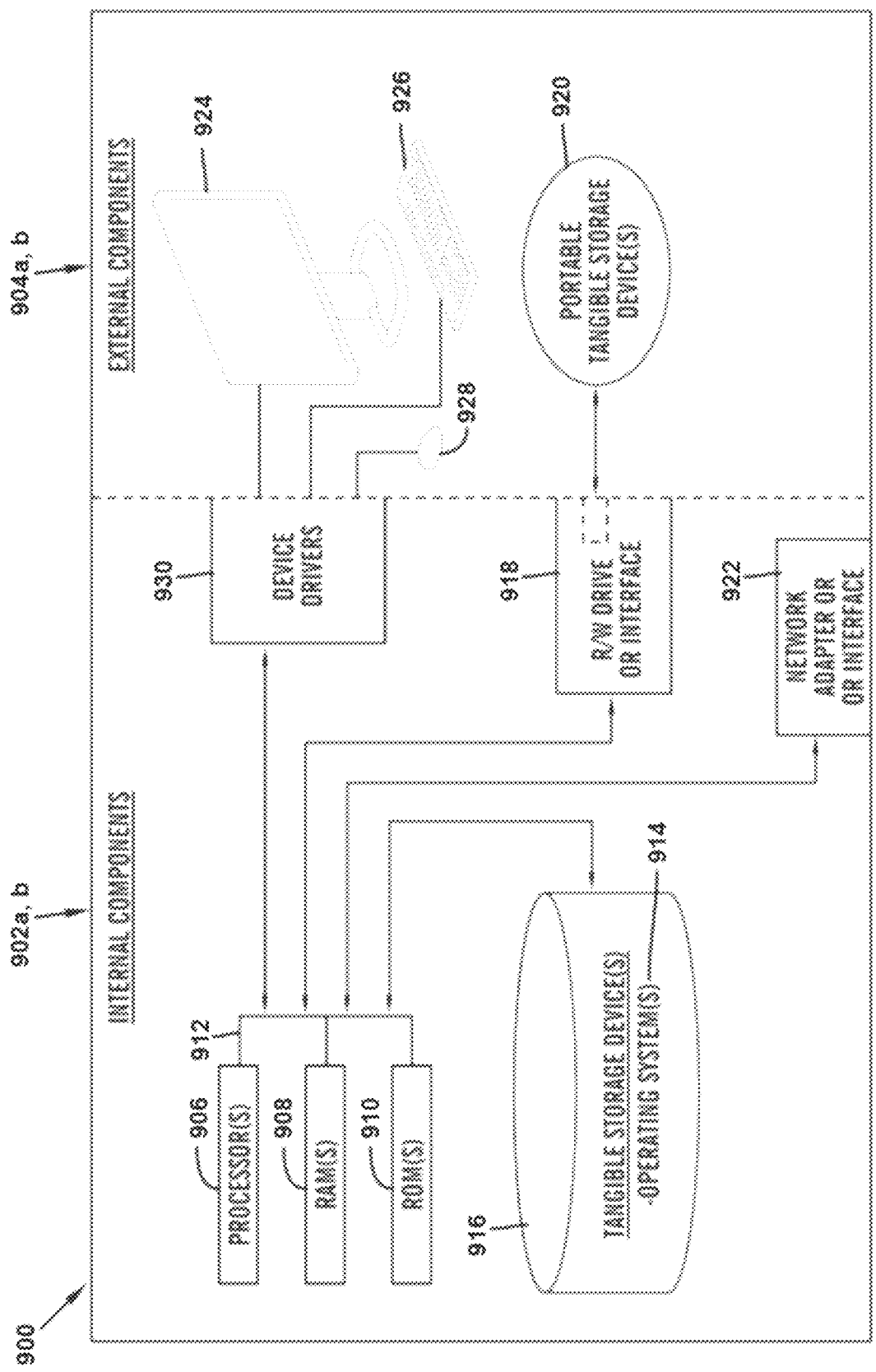
FIG. 5 is a block diagram of internal and external components of computers and servers depicted in FIG. 2 according to at least one embodiment.

FIG. 5 is a block diagram 900 of internal and external components of computers depicted in FIG. 2, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902a, b, and 904, b is representative of any electronic device capable of executing machine-readable program instructions. Data processing system 902a, b, and 904, b may be representative of a smart phone, a computer system, PDA, or other electronic devices. Examples of computing systems, environments, and/or configurations that may represented by data processing system 902a, b, and, 904a, b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computers 115A-D and communication network 200 may include respective sets of internal components 902a, b and external components 904a, b illustrated in FIG. 5. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the client computers 115A-D, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, and the processor can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program can be downloaded from an external computer (e.g., server) via a network (for example, the Internet, a local area network or other, wide area network) and respective network adapters or interfaces 922. From the network adapters (or switch port adaptors) or interfaces 922, the software program in client computers 115A-D are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918 and network adapter or interface 922 comprise hardware and software (stored in tangible storage device 916 and/or ROM 910).

To satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain, and involve (and any forms thereof) should be intended with an open, non-exhaustive meaning (e.g., not limited to the recited items), the terms based on, dependent on, according to, function of (and any forms thereof) should be intended as a non-exclusive relationship (e.g., with possible further variables involved), the term a/an should be intended as one or more items (unless expressly indicated otherwise), and the term means for (or any means-plus-function formulation) should be intended as any structure adapted or configured for carrying out the relevant function. Each item presented in a group is not be construed as a de facto equivalent of any other item of the same list solely based on their common presentation without indications to the contrary (but they are individually identified as separate and unique items); likewise, different embodiments, examples or alternatives are not to be construed as a de facto equivalent of one another (but they are separate and autonomous representations of the present disclosure).

For example, an embodiment provides a method for managing a mobile computing device in an emergency condition. However, the mobile computing device may be of any type (see below); moreover, the method may be applied to any emergency condition, which have caused any health detriments to persons involved in any disaster or it may pose any immediate threat to their health (for example, any natural disaster like earthquake, landslide, volcanic eruption, flood, hurricane, tornado, blizzard, tsunamis, cyclone, any man-made disaster like stampede, fire, transport accident, industrial accident, oil spill, etc.).

In an embodiment, the method comprises receiving (by the mobile computing device) an emergency message indicative of the emergency condition. However, the emergency message may be of any type (for example, with or without additional information like the emergency type, the emergency area).

In an embodiment, the emergency message is distributed from a management computing system to any mobile computing devices in an emergency area corresponding to the emergency condition. However, the management computing system may be of any type (see below) for distributing the emergency message in any way (for example, via mobile telephone operators or directly); moreover, the emergency message may be distributed to any mobile computing devices in the emergency area (for example, according to their GPS coordinates, geographical coordinates, connected base stations) corresponding to the emergency condition in any way (for example, defined by a perimeter of the emergency condition, a range around an epicenter thereof).

In an embodiment, the method comprises collecting (by the mobile computing device) one or more involvement parameters, depending on an involvement of a person holding the mobile computing device in the emergency condition, in response to the emergency message. However, the involvement parameters may be in any number and they may depend on any type of involvement of the person in the emergency condition (for example, health condition, risk for the health, movement impediment, hostage condition, or any combination thereof); moreover, the involvement parameters may be collected in any way (for example, measured/determined automatically and/or entered manually by the person).

In an embodiment, the method comprises determining (by the mobile computing device) an involvement indicator, representative of the involvement of the person, according to the involvement parameters. However, the involvement indicator may be of any type (for example, continuous or discrete) and it may be determined in any way according to the involvement parameters (for example, with any formulas, rules, knowledge bases).

In an embodiment, the method comprises sending (by the mobile computing device) the involvement indicator to the management computing system. However, the involvement indicator may be sent to the management computing system in any way (either the same or different with respect to the receiving of the emergency message).

In an embodiment, the method comprises controlling (by the mobile computing device) one or more resources thereof according to the involvement indicator. However, the resources may be in any number and of any type (for example, hardware and/or software resources like apps, communication facilities, peripherals) and they may be controlled in any way according to the involvement indicator (for example, by enabling, disabling, increasing, decreasing, sharing them).

In an embodiment, the method comprises recording (by a microphone or a digital camera of the mobile computing device) a sound or digital video recording. However, the sound may be recorded in any way (for example, over any period, with or without a prompt message for the person).

In an embodiment, the method comprises determining (by the mobile computing device) one or more of the involvement parameters according to the sound or digital video recording. However, any number and type of involvement parameters (for example, relating to health condition, noise) may be determined in any way according to the sound or digital video recording (for example, with cognitive, fuzzy logic, artificial intelligence, voice recognition techniques).

In an embodiment, the method comprises measuring (by a wearable unit of the mobile computing device) one or more biometric parameters of the person defining corresponding ones of the involvement parameters. However, the wearable unit may be of any type (for example, a smart-watch, a band) and it may be used to measure any number and type of biometric (heartrate, perspiration, etc.) parameters (for example, partial, different or additional biometric parameters with respect to the ones mentioned above).

In an embodiment, the method comprises assigning (by the mobile computing device) a critical role thereto in response to the involvement indicator being representative of a critical condition of the person. However, the critical condition may be of any type (for example, a bad health condition like injury or unconsciousness, a risk condition) and it may be determined in any way according to the involvement indicator (for example, when it reaches any threshold, when this happens for two or more consecutive verifications); moreover, the critical role may be assigned in any way (for example, by saving the value of the role or asserting a corresponding flag in any structure of the mass/working memory).

In an embodiment, the method comprises controlling (by the mobile computing device having the critical role) the resources thereof to reduce an energy consumption of the mobile computing device. However, the resources may be controlled in any way to reduce the energy consumption (for example, by disabling functionalities, by disabling applications, by communicating locally with the mobile computing devices having the relay role or any combination thereof, either indiscriminately, or gradually according to the involvement indicator).

In an embodiment, the method comprises disabling (by the mobile computing device having the critical role) one or more functionalities thereof, including but not limited to applications. However, the functionalities may be in any number and of any type (for example, hardware resources, software resources, or any combination thereof) and they may be disabled in any way (for example, by turning them off or simply reducing their performance, either completely or intermittently).

In an embodiment, the method comprises activating (by the mobile computing device having the critical role) a communication channel for communicating with the management computing system intermittently. However, the communication channel may be of any type (for example, remote or local) and it may be activated intermittently in any way (for example, completely or only in a receiving mode with the possibility of operating in transmitting mode that is always available, with an active period and an inactive period of the communication channel that are variable or fixed).

In an embodiment, the method comprises activating (by the mobile computing device having the critical role) the communication channel intermittently according to the involvement indicator and/or a lifetime of the mobile computing device. However, the activity and/or inactivity period may depend in any way on the involvement indicator and on any indication of the lifetime (of the battery), such as a charge level of the battery, an average energy consumption (for example, with a linear or non-linear law).

In an embodiment, the method comprises receiving (by the mobile computing device) a switching message, indicative of a switch of the mobile computing device to a relay role, from the management computing system. However, the switching message may be of any type (for example, a common message indicating the new role or a dedicated message for switching to the relay role with possibly another dedicated message for switching to the none role) and it may be received in any way (for example, in the same or different way with respect to the emergency message).

In an embodiment, the method comprises assigning (by the mobile computing device) the relay role thereto in response to the switching message. However, the relay role may be assigned in any way (either the same or different with respect to the critical role).

In an embodiment, the method comprises sharing (by the mobile computing device having the relay role) a communication functionality thereof with one or more of the mobile computing devices having the critical role for communicating with the management computing system. However, the communication functionality may be of any type (for example, 3G, 4G, Wi-Fi) and it may be shared in any way (for example, by forwarding any communication between the critical mobile computing devices and the management computing system, by operating as a hot spot).

In an embodiment, the method comprises measuring (by the mobile computing device) one or more communication parameters, which are indicative of a capability of the mobile computing device to share the communication functionality. However, the communication parameters may be in any number and of any type (for example, relating to a quality of the communication functionality, a lifetime of the battery of the mobile computing device, a position of the mobile computing device, or any combination thereof).

In an embodiment, the method comprises sending (by the mobile computing device) the communication parameters to the management computing system. However, the communication parameters may be sent in any way (for example, together with the involvement indicator or independently).

In an embodiment, this causes the management computing system to select one or more of the mobile computing devices to be assigned the relay role according to the corresponding communication parameters. However, the mobile computing devices to be assigned the relay role may be selected in any way (for example, to serve as many mobile computing devices having the critical role as possible or at most in a predefined number/percentage, according to any formulas, rules or knowledge bases).

In an embodiment, the method comprises measuring (by the mobile computing device) an indication of a quality of the communication functionality, of a lifetime of the mobile computing device, and/or of a position of the mobile computing device defining corresponding indications of the communication parameters. However, these communication parameters may be defined in any way (for example, by type, strength, speed and/or bandwidth of any connection for the quality of the communication functionality, by battery level and/or average energy consumption for the lifetime of the mobile computing device, and by GPS coordinates, geographical coordinates, connected base station for the position of the mobile computing device).

In an embodiment, the method comprises repeating (by the mobile computing device) said step of collecting one or more involvement parameters, said step of determining an involvement indicator and said step of controlling one or more resources periodically. However, these steps may be repeated with any periodicity and in any way, down to none (for example, by determining the involvement indicator only when at least one involvement parameter has changed or indiscriminately, by sending the involvement indicator to the management computing system always or only when it has changed).

In an embodiment, the method comprises repeating (by the mobile computing device) said step of measuring one or more communication parameters and said step of sending the communication parameters periodically. However, these steps may be repeated with any periodicity and in any way, down to none (for example, by sending all the communication parameters or only the changed ones to the management computing system, by sending a heart-beat message when no communication parameter has changed).

In an embodiment, the method comprises receiving (by the mobile computing device having the critical role) a further switching message from the management computing system. However, the further switching message may be of any type (for example, a common message indicating the new communication mode or a dedicated message for switching to the local communication mode with possibly another dedicated message for switching to the remote communication mode) and it may be received in any way (for example, in the same or different way with respect to the emergency message or the switching message).

In an embodiment, the further switching message is indicative of an availability of one or more of the mobile computing devices having the relay role for the mobile computing device having the critical role. However, the further switching message may provide any information (for example, simply the availability of the mobile computing devices having the relay role or the specification of corresponding one or more of them).

In an embodiment, the method comprises assigning (by the mobile computing device having the critical role) a local communication mode thereto in response to the further switching message. However, the local communication mode may be assigned in any way (for example, by saving the value of the communication mode or asserting a corresponding flag in any structure of the mass/working memory).

In an embodiment, the method comprises disabling (by the mobile computing device having the local communication mode) any remote communication functionality of the mobile computing device. However, the remote communication functionalities may be in any number and of any type (for example, 3G, 4G, Wi-Fi).

In an embodiment, the method comprises enabling (by the mobile computing device having the local communication mode) a local communication functionality thereof for communicating with at least one of the mobile computing devices having the relay role. However, the local communication functionalities may be in any number and of any type (for example, Bluetooth, Wi-Fi), and they may be used for communicating with any number and type of relay mobile computing devices (for example, the first available one, the closest one, the one indicated in the further switching message, all of them).

In an embodiment, the method comprises starting (by the mobile computing device) an emergency client for managing the mobile computing device in the emergency condition in response to the emergency message. However, the emergency client may be of any type (for example, an app, a daemon, a service); in any case, the possibility does not exclude having the emergency client already running in the background (listening for the emergency message).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently, or in an interleaved way (at least in part).

An embodiment provides a computer program configured for causing a mobile computing device to perform the above-described method when the computer program is executed on the mobile computing device. An embodiment provides a computer program product that comprises a computer readable storage medium having program instructions embodied therewith; the program instructions are executable by a mobile computing device to cause the mobile computing device to perform the same method. However, the computer program may be implemented as a stand-alone module, as a plug-in for a pre-existing software program (for example, the operating system), or even directly in the latter. Moreover, the computer program may be executed on any mobile computing device (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing each of the steps of the above-described method. An embodiment provides a system comprising a circuit (e.g., any hardware suitably configured, for example, by software) for performing each of the steps of the same method. However, the system may be of any type (for example, the mobile computing device only, the management computing system only, the management computing system with one or more mobile computing devices communicating among them via any local, wide area, global, cellular or satellite network and exploiting any type of wired and/or wireless connections); moreover, the mobile computing device may be of any type (for example, a smartphone, a phablet, tablet, a pervasive apparatus) and the management computing system may be implemented by any physical machine, virtual machine or a static or dynamic combination thereof (for example, with a dedicated structure or integrated in the computing system of each mobile telephone operator).

Generally, similar considerations apply if the system has a different structure or comprises equivalent components or it has other operative characteristics. In any case, every component thereof may be separated into more elements, or two or more components may be combined into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for managing a first mobile computing device in a set of mobile computing devices in an emergency area corresponding to an emergency condition, the computer program product comprising a computer readable storage medium having program instructions embodied therewith, the program instructions executable by the first mobile computing device to cause the first mobile computing device to perform a method comprising:

receiving, by the first mobile computing device, an emergency message indicative of the emergency condition, the emergency message being distributed from a management computing system to the set of mobile computing devices in the emergency area;

collecting, by the first mobile computing device, and in response to the emergency message, one or more involvement parameters that correspond to a health condition of a person in the emergency area and associated with the first mobile computing device, the one or more involvement parameters based on one or more biometric parameters of the person;

determining, by the first mobile computing device, an involvement indicator representative of the health condition of the person according to the one or more involvement parameters;

sending, by the first mobile computing device, the involvement indicator to the management computing system; and controlling, by the first mobile computing device, one or more resources thereof according to the involvement indicator.

2. The computer program product of claim 1, the method further comprising:

measuring, by a wearable unit of the first mobile computing device, the one or more biometric parameters of the person.

3. The computer program product of claim 1, the method further comprising:

assigning, by the first mobile computing device, a critical role to the first mobile computing device, in response to the involvement indicator being representative of a critical condition of the person; and controlling, by the first mobile computing device and in response to the first mobile computing device having the critical role, the one or more resources of the first mobile computing device to reduce an energy consumption of the first mobile computing device.

4. The computer program product of claim 3, the method further comprising:

disabling, by the first mobile computing device and in response to the first mobile computing device having the critical role, one or more functionalities of the first mobile computing device.

5. The computer program product of claim 3, the method further comprising:

activating, by the first mobile computing device, a communication channel for communicating with the management computing system intermittently.

6. The computer program product of claim 5, the method further comprising:

activating, by the first mobile computing device, the communication channel intermittently according to the involvement indicator and a lifetime of the first mobile computing device.

7. The computer program product of claim 1, the method further comprising:

receiving, by the first mobile computing device, a switching message from the management computing system, the switching message indicative of a switch of the first mobile computing device to a relay role;

assigning, by the first mobile computing device, the relay role to the first mobile computing device in response to the switching message; and sharing, by the first mobile computing device, a communication functionality of the first mobile computing device with a second mobile computing device in the set of mobile computing devices, wherein the second mobile computing device has a critical role for communicating with the management computing system.

8. The computer program product of claim 7, the method further comprising:

measuring, by the first mobile computing device, one or more communication parameters indicative of a capability of the first mobile computing device to share the communication functionality; and sending, by the first mobile computing device, the one or more communication parameters to the management computing system to cause the management computing system to select a third mobile computing device, in the set of mobile computing devices, to be assigned a relay role according to the one or more communication parameters.

9. The computer program product of claim 8, the method further comprising:

measuring, by the first mobile computing device, an indication of a quality of the communication functionality, an indication of a lifetime of the first mobile computing device, and an indication of a position of the first mobile computing device.

10. The computer program product of claim 1, wherein the involvement indicator comprises a value corresponding to the health condition of the person.

11. A system comprising:

a processor; and a memory in communication with the processor, the memory containing program instructions that, when executed by the processor, are configured to cause the processor to perform a method, the method comprising:

receiving, by a first mobile computing device in a set of mobile computing devices in an emergency area corresponding to an emergency condition, an emergency message indicative of the emergency condition, the emergency message being distributed from a management computing system to the set of mobile computing devices in the emergency area;

collecting, by the first mobile computing device, and in response to the emergency message, one or more involvement parameters that correspond to a state of a person in the emergency area and associated with the first mobile computing device;

determining, by the first mobile computing device, an involvement indicator representative of the state of the person according to the one or more involvement parameters;

sending, by the first mobile computing device, the involvement indicator to the management computing system;

controlling, by the first mobile computing device, one or more resources of the first mobile computing device according to the involvement indicator; and measuring, by a wearable unit of the first mobile computing device, one or more biometric parameters of the person.

12. The system of claim 11, the method further comprising:

recording, by a microphone of the first mobile computing device, a sound; and determining, by the first mobile computing device, one or more of the one or more involvement parameters according to the sound.

13. The system of claim 11, the method further comprising:

assigning, by the first mobile computing device, a critical role to the first mobile computing device, in response to the involvement indicator being representative of a critical condition of the person; and controlling, by the first mobile computing device and in response to the first mobile computing device having the critical role, the one or more resources of the first mobile computing device to reduce an energy consumption of the first mobile computing device.

14. The system of claim 13, the method further comprising:
disabling, by the first mobile computing device and in response to the first mobile computing device having the critical role, one or more functionalities of the first mobile computing device.

15. The system of claim 13, the method further comprising:
activating, by the first mobile computing device, a communication channel for communicating with the management computing system intermittently.

16. The system of claim 15, the method further comprising:
activating, by the first mobile computing device, the communication channel intermittently according to the involvement indicator and a lifetime of the first mobile computing device.

17. The system of claim 11, the method further comprising:
receiving, by the first mobile computing device, a switching message from the management computing system,
the switching message indicative of a switch of the first mobile computing device to a relay role;
assigning, by the first mobile computing device, the relay role to the first mobile computing device in response to the switching message; and
sharing, by the first mobile computing device, a communication functionality of the first mobile computing device with a second mobile computing device in the set of mobile computing devices,
wherein the second mobile computing device has a critical role for communicating with the management computing system.

18. The system of claim 17, the method further comprising:
measuring, by the first mobile computing device, one or more communication parameters indicative of a capability of the first mobile computing device to share the communication functionality; and
sending, by the first mobile computing device, the one or more communication parameters to the management computing system to cause the management computing system to select a third mobile computing device, in the set of mobile computing devices, to be assigned a relay role according to the one or more communication parameters.

19. The system of claim 18, the method further comprising:
measuring, by the first mobile computing device, an indication of a quality of the communication functionality, an indication of a lifetime of the first mobile computing device, and an indication of a position of the first mobile computing device.

20. A computer program product for managing a first mobile computing device in a set of mobile computing devices in an emergency area corresponding to an emergency condition, the computer program product comprising a computer readable storage medium having program instructions embodied therewith, the program instructions executable by the first mobile computing device to cause the first mobile computing device to perform a method comprising:
receiving, by the first mobile computing device, an emergency message indicative of the emergency condition,
the emergency message being distributed from a management computing system to the set of mobile computing devices in the emergency area;
collecting, by the first mobile computing device, and in response to the emergency message, one or more involvement parameters that correspond to a state of a person in the emergency area and associated with the first mobile computing device;
determining, by the first mobile computing device, an involvement indicator representative of the state of the person according to the one or more involvement parameters;
sending, by the first mobile computing device, the involvement indicator to the management computing system;
controlling, by the first mobile computing device, one or more resources of the first mobile computing device according to the involvement indicator;
receiving, by the first mobile computing device, a switching message from the management computing system,
the switching message indicative of a switch of the first mobile computing device to a relay role;
assigning, by the first mobile computing device, the relay role to the first mobile computing device in response to the switching message;
sharing, by the first mobile computing device, a communication functionality of the first mobile computing device with a second mobile computing device in the set of mobile computing devices,
wherein the second mobile computing device has a critical role for communicating with the management computing system;
assigning, by the first mobile computing device, a critical role to the first mobile computing device in response to the involvement indicator being representative of a critical condition of the person;
receiving, by the first mobile computing device, a further switching message from the management computing system indicative of an availability of a fourth mobile computing device, in the set of mobile computing devices, having a relay role for the first mobile computing device;
assigning, by the first mobile computing device, a local communication mode to the first mobile computing device in response to the further switching message;
disabling, by the first mobile computing device a remote communication functionality of the first mobile computing device; and
enabling, by the first mobile computing device, a local communication functionality of the first mobile computing device for communicating with the fourth mobile computing device.

* * * * *